United States Patent [19]

Bacigalupe et al.

[11] Patent Number: 4,760,911

[45] Date of Patent: Aug. 2, 1988

[54] CONVEYOR SYSTEM FOR USE IN A CONTINUOUS PROOFING AND BAKING APPARATUS

[75] Inventors: Carlos Bacigalupe, The Colony; Michael J. Dobie, Plano, both of Tex.

[73] Assignee: Stewart Systems, Inc., Plano, Tex.

[21] Appl. No.: 66,563

[22] Filed: Jun. 26, 1987

[51] Int. Cl.⁴ .............................................. B65G 37/00

[52] U.S. Cl. ................................. 198/474.1; 198/831; 198/778

[58] Field of Search ............ 198/697, 802, 831, 474.1, 198/476.1, 477.1, 778; 99/477, 478, 479

[56] References Cited

U.S. PATENT DOCUMENTS

| | | | |
|---|---|---|---|
| 1,090,948 | 3/1914 | Sklovsky et al. . | |
| 2,685,361 | 8/1954 | Garman et al. . | |
| 3,094,206 | 6/1963 | Stewart et al. . | |
| 3,367,474 | 2/1968 | Kerr et al. | 198/831 X |
| 3,570,651 | 3/1971 | Lanhem et al. | 198/778 |
| 3,653,493 | 4/1972 | Kerr . | |
| 3,708,059 | 1/1973 | Ackermann . | |
| 3,934,708 | 1/1976 | Kambara . | |
| 4,004,681 | 1/1977 | Clewett et al. | 198/365 |
| 4,181,215 | 1/1980 | Carpenter | 198/477.1 X |
| 4,301,915 | 11/1981 | Michalik et al. | 198/851 |

*Primary Examiner*—Robert J. Spar
*Assistant Examiner*—Cheryl L. Gastineau
*Attorney, Agent, or Firm*—Michael A. O'Neil

[57] ABSTRACT

A conveyor system for use in a continuous proofing and baking apparatus, having a conveyor chain for movement through an elongated track. Each link of the conveyor chain carries a product supporting grid. There is a rocker on each product supporting grid, for securing a bakery pan in engagement with the product supporting grid during movement of the product supporting grid along the track under the action of the conveyor chain. Each rocker has an upwardly extending portion for engaging the bakery pan between a pair of compartments of the bakery pan. In one embodiment of the invention, the rocker has a second upwardly extending portion, one upwardly extending portion being centrally disposed, and the other being offset. Each rocker can pivot in a horizontal plane relative to the product supporting grid. Thus, a baking pan can go around a curve without binding. If a baking pan is large enough to be supported on two successive product supporting grids, the rockers on those grids can be aligned at all times.

10 Claims, 3 Drawing Sheets

55
43
55
33
51
35
49
35
37
31
53
33
31
35
39
39
13
21
23
35
27
29
25
23
11
15
21
17
21
13
25
23
19
21
27
25
17
19
25

29
43
41
43
31
47
43
2
2
41
43
29

CONVEYOR SYSTEM FOR USE IN A CONTINUOUS PROOFING AND BAKING APPARATUS

BACKGROUND OF THE INVENTION

1. Field of the Invention

This invention relates in general to continuous proofing and baking apparatus for use in bakeries. In particular, the invention relates to an improved conveyor system which is particularly designed for use in a continuous proofing and baking apparatus.

2. Description of the Prior Art

This invention is basically an improvement of the invention disclosed and claimed in the commonly owned U.S. patent application, Ser. No. 06/880,642, filed June 27, 1986, which is a continuation of U.S. patent application, Ser. No. 06/593,088, filed Mar. 26, 1986, now abandoned. The prior patent application is incorporated by reference.

The prior application discloses a conveyor system for use in a continuous proofing and baking apparatus. The apparatus has a conveyor system, which includes a track and a conveyor chain for movement along the track. The links of the conveyor chain include a first connection member and a second connection member, separated by a pair of parallel plates. The upper parallel plate keeps debris from entering the track.

A product supporting grid is carried by the first connection member of each link. A cover member secures the product supporting grid to the link, and cooperates with the upper parallel plate to prevent debris from entering the track.

A rocker is mounted on each product supporting grid. Each rocker has a central portion and an offset portion for securing a bakery pan in engagement with the product supporting grid. The rocker can pivot about a horizontal axis. so that either the central portion or the offset portion engages the bakery pan between two rows of compartments. The central portion will engage a bakery pan having an even number of rows of compartments, and the offset portion will engage a bakery pan having an uneven number of rows.

As the conveyor chain moves along the track, the track sometimes curves. When the track curves, the product supporting grids pivot with respect to one another. While two grids are pivoted with the respect to one another, the rockers on those two grids are not aligned. The rockers will bind against the bakery pan, and the pan will not travel smoothly around the curve. For this reason, a large bakery pan cannot be placed on two consecutive product supporting grids. If the rockers on two successive product supporting grids could be kept in alignment, while the grids are pivoted with respect to one another, then an oversized bakery pan could be supported by the two product supporting grids.

SUMMARY OF THE INVENTION

The conveyor system of the present invention allows a bakery pan to go around a curve without binding. The system also allows an oversized bakery pan to be carried by two successive product supporting grids. This is possible because the rockers are pivotable in a horizontal plane. Further, the angle of the pivot is large enough to allow the rockers on two successive product supporting grids to be aligned at all times as the conveyor system moves around curves in the track.

The conveyor system of the invention has an elongated track and a conveyor chain for movement about the track. A product supporting grid is carried on each link of the conveyor chain, and a rocker is mounted on each product supporting grid.

Each rocker is pivotable in a horizontal plane. The angle of pivot is sufficient to allow the rockers on any two successive product supporting grids to be aligned at all times. Therefore, a single bakery pan can be supported by two consecutive product supporting grids.

The rocker may have one or two upwardly extending portions for engaging the bakery pan between a pair of rows of compartments. The rocker having two such portions rock left and right to support bakery pans having either an even or an uneven number of compartments.

DESCRIPTION OF THE PREFERRED EMBODIMENTS

The methods of making and using a similar continuous proofing and baking apparatus are explained in the commonly owned U.S. patent application, Ser. No. 06/593,088, filed Mar. 26, 1986, now abandoned. The prior patent application is incorporated by reference.

Figure 1:
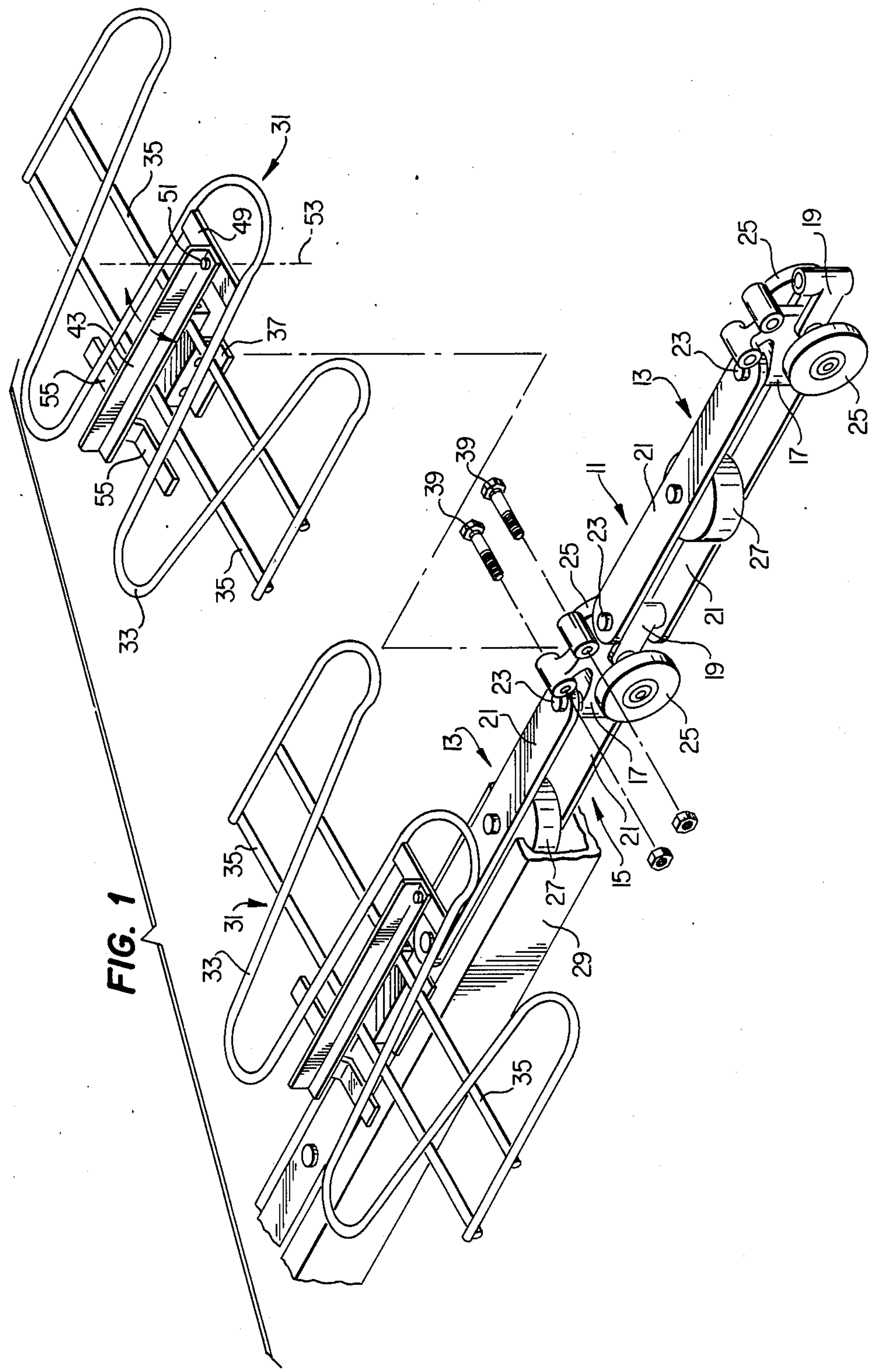
FIG. 1 is an exploded partial perspective view of the conveyor system of the continuous proofing and baking apparatus of the invention.
Figure 2:
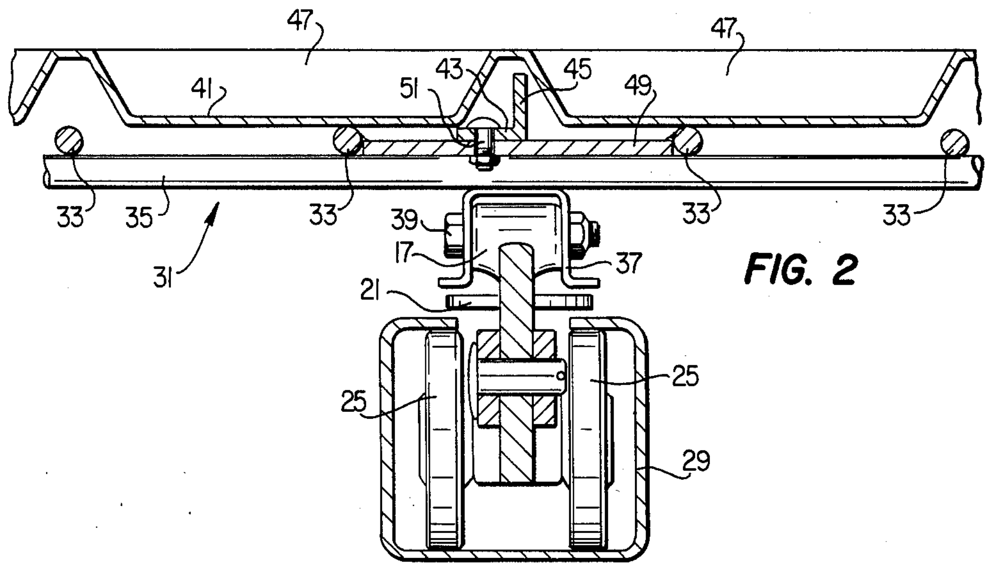
FIG. 2 is a sectional view taken along the line 2—2 in FIG. 3.

The improved conveyor system 11 of the invention is illustrated in FIGS. 1 and 2. The conveyor system 11 includes a plurality of links 13, which are connected together to form a conveyor chain 15. Each link has a first connection member 17 and a second connection member 19, connected to the opposite ends of a pair of parallel, elongated plates 21. The plates 21 are connected to the connection members 17, 19 by vertical pins 23, which allow the conveyor chain 15 to flex in a horizontal plane.

A pair of vertical rollers 25 are connected to each of the first connection members 17. A horizontal roller 27 is located between and near the center of the elongated plates 21. The vertical and horizontal rollers 25, 27 roll within the interior of a rectangular track 29.

Each of the first connection members 17 is designed to carry a product supporting grid 31. Each product supporting grid 31 consists of a sinuous bar 33 mounted on a pair of parallel bars 35. A cover member 37 is welded to the lower side of the two parallel bars 35. The cover member 37 is connected to the first connection member 17 by a pair of bolts 39.

FIG. 2 shows how a bakery pan 41 may be supported by the product supporting grid 31. The pan 41 is set on the sinuous bar 33 and is held in place by a rocker 43. The rocker 43 has an upwardly extending portion 45, which extends upward between the two middle rows of compartments 47 in the bakery pan 41.

As both FIGS. 1 and 2 show, the rocker 43 is pinned to a cross member 49, which is welded to the sinuous bar 33. The pin 51 which connects the rocker 43 to the cross member 49 allows the rocker 43 to pivot in a horizontal plane about a vertical axis 53 through the pin 51, as shown by the arrows in FIG. 1.

A pair of lateral members 55 extend outward from the free end of the rocker 43. The lateral members 55 cross under the sinuous bar 33 and help to stabilize the rocker 43.

Figure 3:
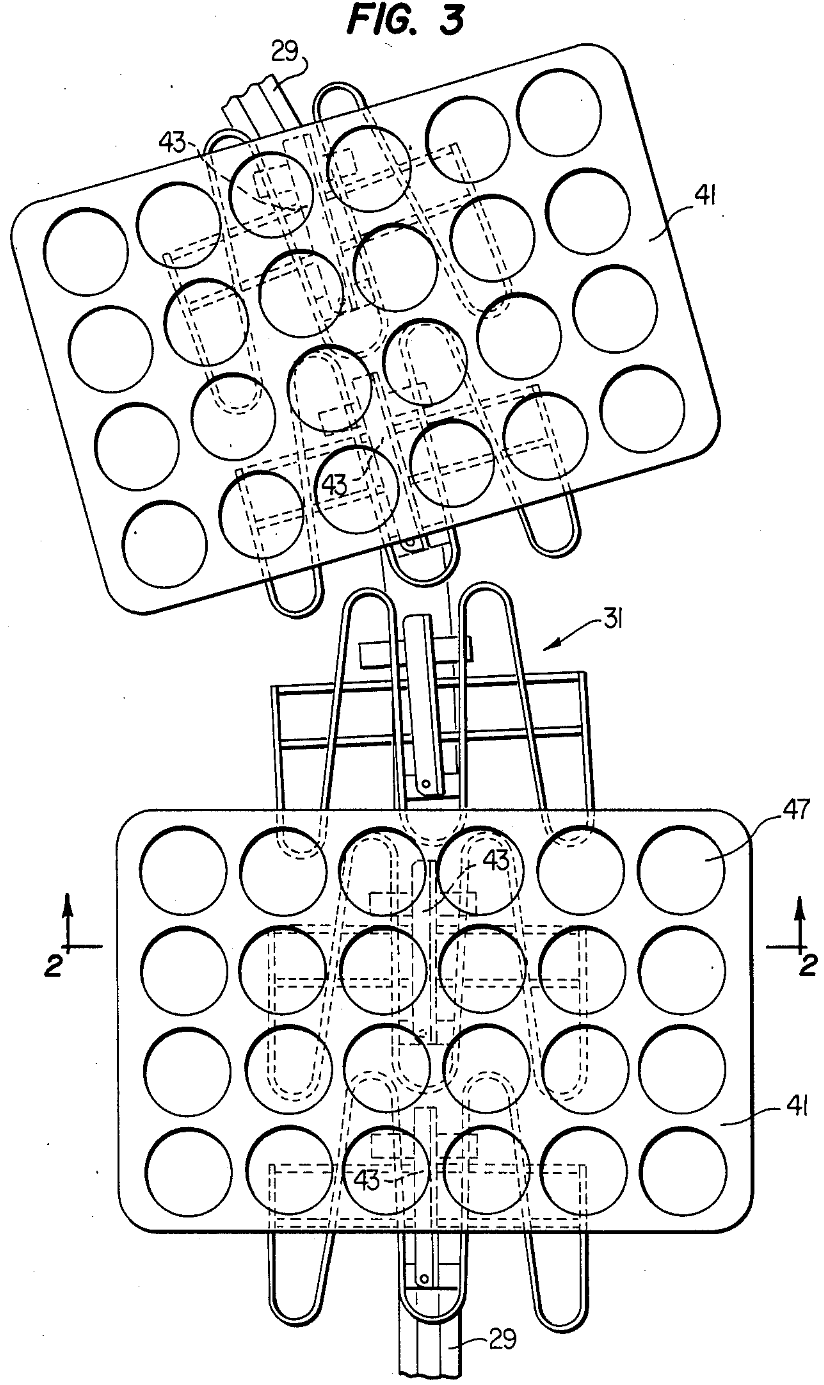
FIG. 3 is a partial top view of the conveyor system of the continuous proofing and baking apparatus of the invention.

As shown in FIG. 3, some bakery pans 41 are large enough to require two successive product supporting grids 31. The rockers 43 on the two grids 31 fit between two rows of compartments 47 in the bakery pan 41.

When the conveyor chain 51 is in a straight portion of the track 29, the two grids 31 and the two rockers 43 under the bakery pan 41 are aligned, as shown in the lower portion of FIG. 3. However, when the conveyor chain 51 goes around a curve in the track 29, the two grids 31 are not aligned, as shown in the upper portion of FIG. 3. The rockers 43, however, pivot relative to the grids 31, so that the two rockers 43 remain aligned with one another and with the rows of compartments 47 in the bakery pan 41. Therefore, the rockers 43 do not bind against the compartments 47 as the pan 41 goes around a curve in the track 29.

Figure 4:
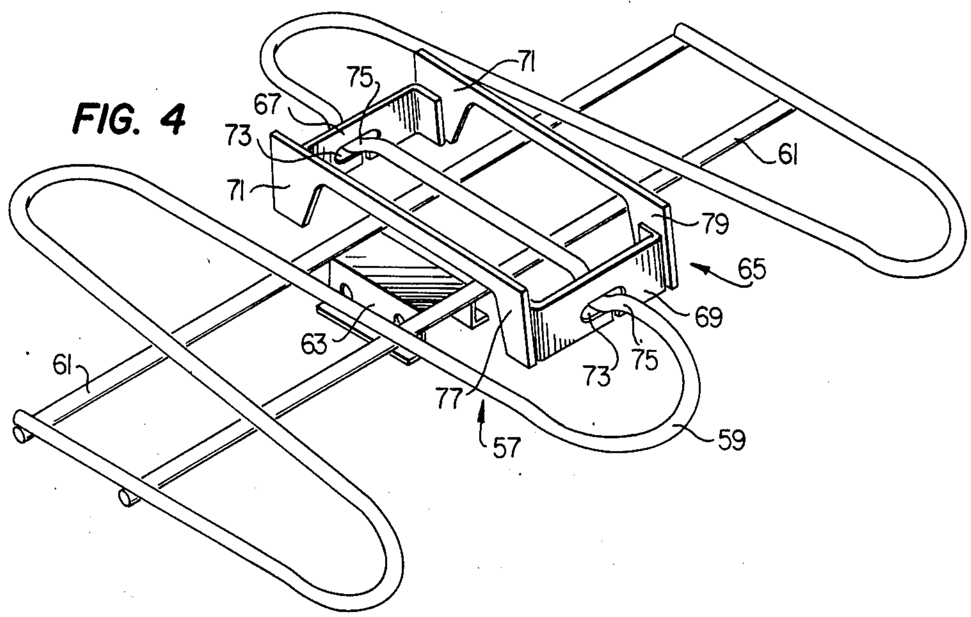
FIG. 4 is a partial perspective view of an alternate embodiment of the product supporting grid.
Figure 5:
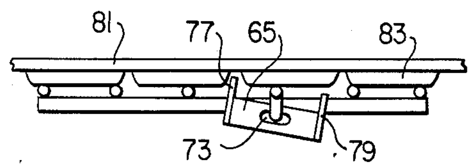
FIG. 5 is a sectional view of the product supporting grid shown in FIG. 4, supporting a bakery pan having an even number of compartments.
Figure 6:
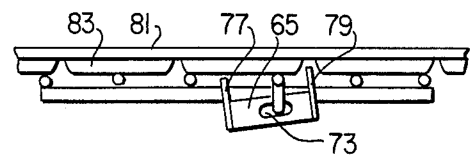
FIG. 6 is a sectional view of the product supporting grid shown in FIG. 4, supporting a bakery pan having an uneven number of compartments.

FIGS. 4, 5, and 6 show an alternate embodiment of the invention. The product supporting grid 57 has an identical sinuous bar 59, parallel bars 61, and cover member 63. This embodiment, however, has a different type of rocker 65. The rocker 65 of this embodiment is basically rectangular, having a front piece 67, a back piece 69, and two side pieces 71.

The front piece 67 and the back piece 69 of the rocker 65 have oval openings 73, through which the sinuous bar 59 passes. The sinuous bar 59 has a downward crook 75 at the points where the sinuous bar 59 passes through the rocker 65. These crooks 75 in the sinuous bar 59 hold the rocker 65 against forward or rearward movement relative to the sinuous bar 59.

The two side pieces 71 of the rocker 65 are generally U-shaped, so that the rocker 65 can rock left and right, as shown in FIGS. 5 and 6. One of the side pieces 71 is centrally disposed and has an upwardly extending position 77. The other side piece 71 is offset and also has an upwardly extending portion 79.

FIGS. 5 and 6 show that the rocker 65 of the alternate embodiment may be used with bakery pans 81 having either an even or an uneven number of rows of compartments 83. If the bakery pan 81 has an even number of rows of compartments 83, the rocker 65 will rotate to the right, as shown in FIG. 5. The centrally disposed upwardly extending portion 77 will move upward between the two center rows of compartments 83, as the offset upwardly extending portion 79 is pushed downward.

If the bakery pan 81 has an uneven number of rows of compartments 83, the rocker 65 will be rotated to the left, as shown in FIG. 6. As the centrally disposed upwardly extending portion 77 is pushed downward, the offset upwardly extending portion 79 is moved upward between two rows of compartments 83.

The oval openings 73 in the front piece 67 and the back piece 69 of the rocker 65 allow the rocker 65 to pivot about a vertical axis. This allows the rockers 65 on two successive product supporting grids 57 to be aligned at all times.

The continuous proofing and baking apparatus of the invention thus has an improved conveyor system, which has several advantages over the prior art. The rocker on the improved conveyor system is pivotable about a vertical axis. This allows the bakery pans to go around curves without binding. Also, the rockers on two successive product supporting grids can be aligned at all times, it the two product supporting grids are supporting a single bakery pan. As the conveyor system moves around a curve in the track, the rockers remain aligned and do not exert an undue amount of pressure on the compartments of the bakery pan.

Only the preferred embodiments of the invention have been illustrated in the drawings and described in this specification. It should be understood that the invention is not limited to the embodiments disclosed, but is capable of numerous rearrangements, modifications, and substitutions of parts and elements, without departing from the spirit of the invention.

I claim:

1. A conveyor system for use in a continuous proofing and baking apparatus, the conveyor system comprising:

an elongated track;

a conveyor chain for movement through the track and having a plurality of links;

a plurality of product supporting grids, each carried by one of the links of the conveyor chain;

a plurality of rockers, each mounted on a product supporting grid, for securing a bakery pan in engagement with the product supporting grid during movement of the product supporting grid along the track under the action of the conveyor chain, wherein the rocker is pivotable in a horizontal plane relative to the product supporting grid.

2. A conveyor system according to claim 1, wherein each rocker further comprises an upwardly extending portion for engaging the bakery pan between a pair of compartments of the bakery pan.

3. A conveyor system according to claim 1, wherein a single bakery pan can be supported by two successive product supporting grids, and the rockers on those product supporting grids can be aligned at all times.

4. A conveyor system according to claim 3, wherein each rocker further comprises an upwardly extending portion for engaging the bakery pan between a pair of compartments of the bakery pan.

5. A conveyor system for use in a continuous proofing and baking apparatus, the conveyor system comprising:

an elongated track;

a conveyor chain for movement through the track and having a plurality of links;

a plurality of product supporting grids, each carried by one of the links of the conveyor chain;

a plurality of elongated rockers, each pivotally mounted at one end to one of the product supporting grids, for securing a bakery pan during movement of the product supporting grid along the track under the action of the conveyor chain, wherein each rocker is pivotable in a horizontal plane relative to the product supporting grid.

6. A conveyor system according to claim 5, wherein each rocker further comprises an upwardly extending portion for engaging the bakery pan between a pair of compartments of the bakery pan.

7. A conveyor system according to claim 5, wherein a single bakery pan can be supported by two successive product supporting grids, and the rockers on those product supporting grids can be aligned at all times.

8. A conveyor system according to claim 7, wherein each rocker further comprises an upwardly extending portion for engaging the bakery pan between a pair of compartments of the bakery pan.

9. A conveyor system for use in a continuous proofing and baking apparatus, the conveyor system comprising:

an elongated track;

a conveyor chain for movement through the track and having a plurality of links;

a plurality of product supporting grids, each carried by one of the links of the conveyor chain;

a plurality of rockers, each mounted on one of the product supporting grids, for securing a bakery pan in engagement with the product supporting grid along the track under the action of the conveyor chain, wherein the rocker is pivotable in a horizontal plane relative to the product supporting grid, and wherein each rocker includes a centrally disposed upwardly extending portion and an offset upwardly extending portion for engaging the bakery pan between a pair of compartments of the bakery pan.

10. A conveyor system according to claim 9, wherein a single bakery pan can be supported by two successive product supporting grids, and the rockers on those product supporting grids can be aligned at all times.

* * * * *